Patented Jan. 9, 1934

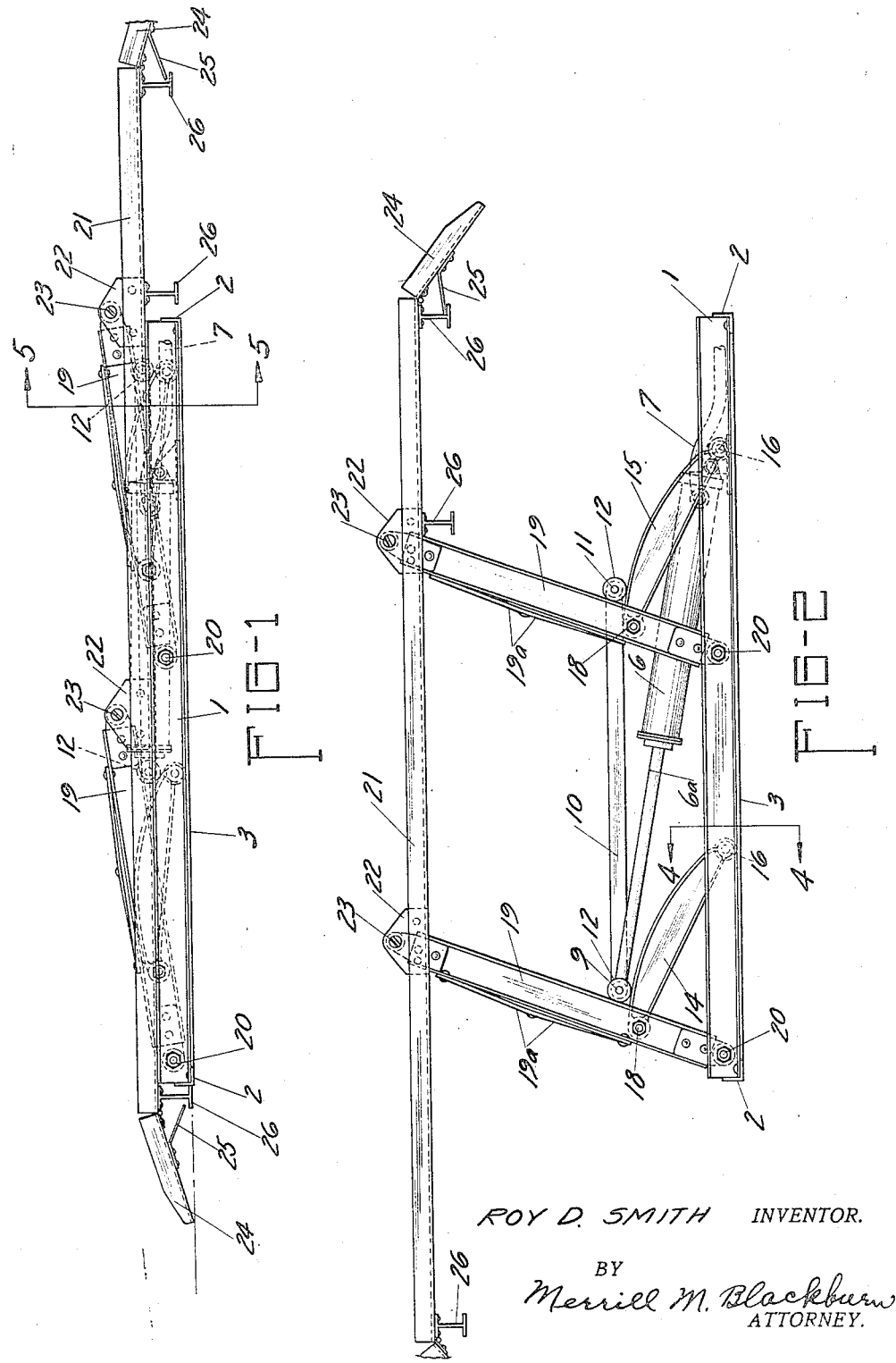

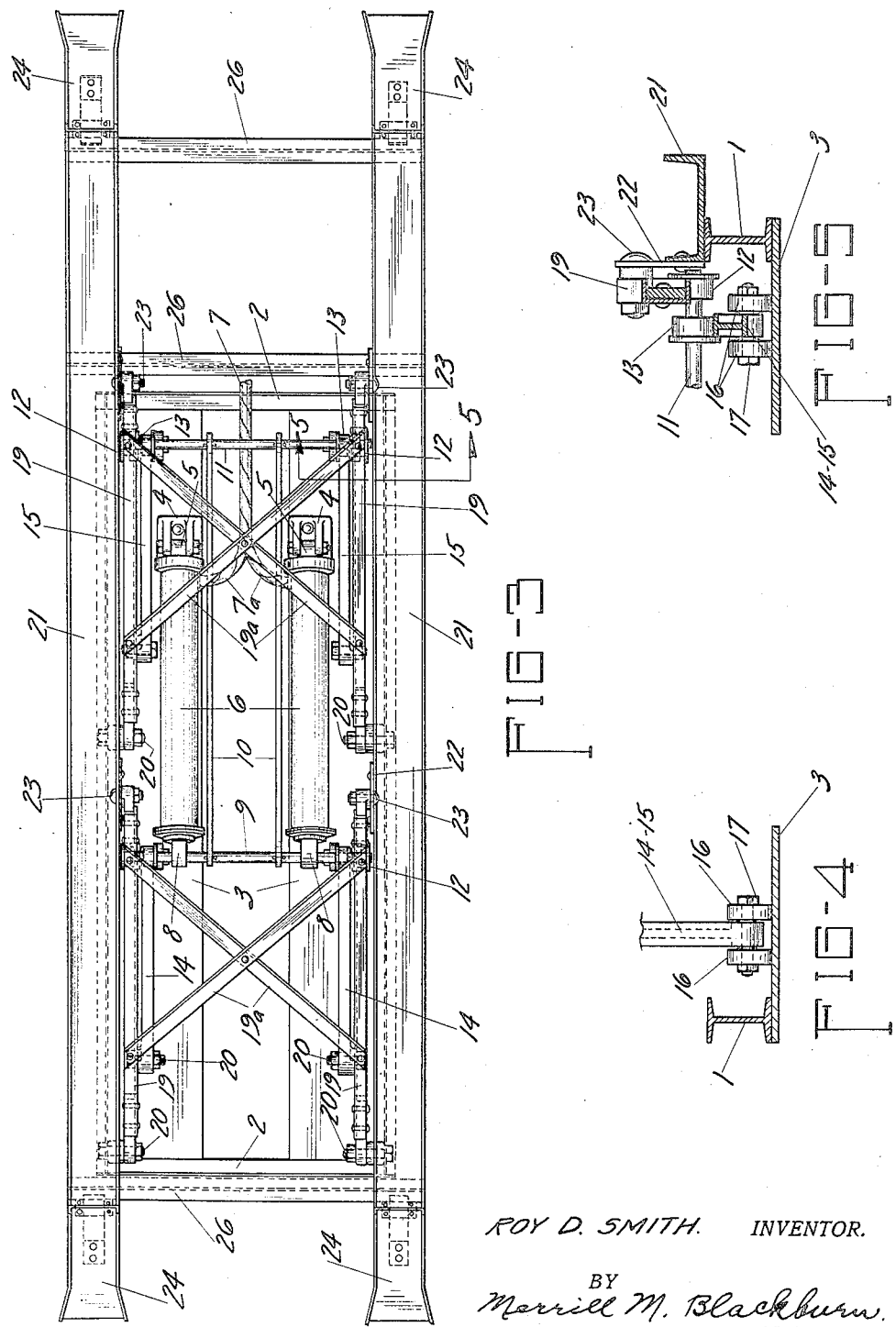

1,942,945

UNITED STATES PATENT OFFICE 1,942,945

VEHICLE HOIST

Roy D. Smith, Davenport, Iowa, assignor to Bee Line Manufacturing Company, Davenport, Iowa, a corporation of Iowa Application June 11, 1931. Serial No. 543,502

9 Claims. (Cl. 254—91)

The present invention relates to hoisting mechanism and more particularly to mechanism for hoisting vehicles, such as automobiles and trucks, though no statement of use is intended to be interpreted in a limiting sense.

Among the objects of this invention are to provide an improved hoisting mechanism; to provide a mechanism of the character indicated which can be installed without the digging of any pit; to provide an apparatus of the character indicated which is easily portable and yet is strong and rigid; to provide an apparatus of the character indicated which has a powerful lift and yet does not require a great deal of power to operate same; to provide an apparatus which will be smooth in operation and which will prevent accidents from happening by virtue of a vehicle being dropped; and such further objects, advantages and capabilities as will hereafter appear and as are inherent in the construction disclosed herein. My invention further resides in the combination, construction and arrangement of parts illustrated in the accompanying drawings and, while I have shown therein what is now considered the preferred embodiment of this invention, I desire the same to be understood as illustrative only and not to be interpreted in a limiting sense.

In the drawings annexed hereto and forming a part hereof,

Fig. 1 is a fragmentary side elevation of my improved structure in a position in which it is ready to receive a vehicle to be hoisted;

Fig. 2 is a similar view of the same structure in raised position;

Fig. 3 is a plan view of the structure as illustrated in Fig. 1;

Fig. 4 is a transverse section substantially along the plane indicated by the line 4—4, Fig. 2;

Fig. 5 is a transverse section substantially along the plane indicated by the liine 5—5, Fig. 1.

Reference will now be made in greater detail to the annexed drawings for a more complete description of this invention. The base frame comprises a pair of side members 1 of channel or I-beam formation, connected together at their ends by means of angles 2. A pair of plates 3 are connected to the sides and ends, 1 and 2, and serve both as supports and as means for making the base frame more rigid. Secured to the plates 3 are brackets 4 having upstanding ears between which are pivotally mounted the lugs 5 projecting from the lower ends of the cylinders 6. An air hose 7 is branched and has its branches 7a connected to the cylinders 6. Of course it will be understood that one or more cylinders may be used, as desired, but I have chosen to illustrate the use of two. The longitudinal plates 3 may be replaced by a cross channel or other structure which will serve as a support for the brackets 4 without in any way changing the functioning of the apparatus.

The cylinders 6 have pistons therein and from these extend piston rods 6a whereby the movable part of the structure may be actuated. Eyes upon the ends of the rods 6a engage as indicated at 8 with the transverse rod 9. Links 10 connect the rod 9 with a rod 11 and the two rods 9 and 11 have at their respective ends rollers 12 and 13.

Levers or cam bars 14 and 15 are provided at their lower ends with rollers 16 which are pivotally connected thereto as by a pivot bolt 17, as shown in Fig. 4. The bars 14 and 15 are pivotally connected, as shown at 18, with the levers 19, and these with the side members 1, as indicated at 20. It will therefore be seen that when the levers 19 are turned about their pivots 20, the cam bars 14 will move with them and will carry the rollers 16 along the plates 3, the same being obvious from Fig. 4. Cross bars 19a connect the two levers 19 on opposite sides of the machine and thus stay the structure against lateral wobbling when an automobile is raised by the hoist.

Channel shaped runways 21 have brackets 22 secured thereto and these brackets are pivotally connected at 23 to the upper ends of the levers 19. The runways 21 have approaches 24 connected thereto, either pivotally or integrally, as desired. If the approaches are pivotally connected to the runways, it is desirable to have stops 25 or some other structure, as indicated in Fig. 2, which will serve to prevent the approaches from dropping down too far when the runways are lifted. Cross beams 26, which are illustrated in the drawings as being of I-beam formation, are secured to the under side of the runways 21 and serve not only to hold these runways a fixed distance apart but also to hold them up away from the ground when an automobile is run thereon.

From the foregoing specification and the annexed drawings, it will be seen that the rollers 12 bear against the under sides of the levers 19 while the rollers 13 rest upon the upper edges of the levers or cam members 14. Therefore, as the rods 9 and 11 move back and forth with the reciprocation of the pistons, the rollers 12 and 13 turn in relatively opposite directions. It will also be observed that the angle between a line parallel with the lower edge of a lever 19 and a tangent to the arc of the upper edge of cam member 14, at a point of contact of the roller 13, increases as the lever 19 rises. However, this angle does not increase as rapidly with the rising of levers 19 as would be the case if the roller contacting faces of members 14 were straight. Of course the greater the angle between these two surfaces, the less will be the lifting power of a piston. At the same time, the amount of lift caused by a linear unit of movement of the piston rods decreases as the levers 19 turn about their pivots 20 and approach a vertical position. Consequently, the mechanical advantage of the entire combination remains approximately uniform throughout the hoisting range, from the lowermost position to the uppermost position. Attention is also called to the fact that the device is so constructed that it can never pass dead center when rising to fully elevated position. In fact, Fig. 2 shows substantially the maximum elevation obtainable, due to the fact that the middle cross bar 26 is so placed that it strikes the rear faces of the two rear levers 19, as shown clearly in this figure, thus stopping the upward and forward movement of hoisting before the parts reach a position of maximum elevation. Therefore, when the fluid is permitted to escape from the cylinders 6, the weight of the runways and any vehicle supported thereon will be sufficient to cause the mechanism to be depressed, thus forcing the pistons into the cylinders and forcing the fluid out of same. As the runways 21 approach the ground or floor, the lower ends of the approaches 24 strike the same and the approaches are turned upwardly about their pivots, in event they are pivoted as indicated in the drawings. If they are not pivoted, their lower ends are in substantially the same plane as the lower faces of the I-beams 26, thus insuring that they will rest upon a flat surface when the I-beams 26 rest thereon in lowered position.

It will of course be understood that the specific description of structure set forth above may be departed from without departing from the spirit of my invention as set forth in this specification and the appended claims.

Having now described my invention, I claim:

1. A hoist comprising a base frame, levers having pivotal connection therewith, supporting means for an object to be raised pivotally connected to said levers, pushing means to push against said levers and cause them to raise the supporting means, and inclined means pivotally connected to said levers and having an end resting on the support for the hoist or on a part of the base, the pushing means acting between the levers and the inclined means to cause the former to be turned about their pivotal connections with the base frame.

2. In a structure of the character described, a base frame, pairs of levers hinged to opposite sides of said frame and turnable in substantially vertical planes, supporting means for a vehicle hingedly connected to the upper portions of said levers and maintained substantially level as the levers carry the supporting means to successively higher and lower positions, means for turning said levers to raise said supporting means, levers connected adjacent one end to an intermediate portion of each of said first mentioned levers and having their opposite ends free to move along a supporting surface, and means reacting between the connected levers to cause the first mentioned levers to be raised.

3. A structure for the purpose indicated comprising a base element having supporting members for travelling members, levers connected adjacent an end to said base element for pivotal motion in substantially vertical planes, vehicle supporting members carried by said levers and lifted thereby when the levers are raised, travelling members connected adjacent one end to said levers and supported at their opposite ends on said supporting members of said base, cross members extending between opposite pairs of levers and travelling members and located between the connected levers and travelling members, said cross members contacting both the levers and the travelling members and, when forced toward said levers causing same to turn about their pivotal connections with the base element to raise the vehicle supporting members to elevated positions, and means to actuate the cross members to cause raising of the vehicle supporting members.

4. A structure as defined by claim 3 in which the actuating means for the levers comprises fluid pressure means connected to the cross members.

5. A structure as defined by claim 3 in which the cross members are connected together to operate in synchronism, thus causing the levers to act simultaneously.

6. A structure as defined by claim 3 in which the cross members are connected together by links so that they will operate simultaneously and in which said cross members have fluid pressure means connected thereto to cause operation thereof and of the levers.

7. In vehicle hoisting means, a base frame, movable hoisting means pivotally connected thereto, said means comprising levers of two classes connected together for simultaneous movement, an end of one lever being pivotally connected to an intermediate portion of another lever and having its free end movable along the base member, said pivotally connected levers having a member reacting between them to cause increase in the size of the angle between said levers, and fluid pressure means to actuate the means between said levers so as to cause increase of the angle between the levers and the raising of one set of levers from a nearly horizontal position to a nearly vertical position.

8. In a hoist, means for lifting a part of an automobile, said means being pivoted adjacent one end to a supporting means to have its other end raised, actuating means for said lifting means, and an elongated segmental cam having one end pivotally connected to the first mentioned means intermediate its ends and having its other end mounted for reciprocating movement, said actuating means being operable between and cooperating with said first mentioned means and said segmental cam, and means to move the actuating means longitudinally with respect to said parts with which it cooperates.

9. A hoist comprising a base frame, levers having pivotal connection therewith, said connection being non-shiftable, supporting means for an object to be raised pivotally connected to said levers, tiltable trackways pivotally connected to said levers and movable lengthwise with relation to said base frame, and fluid pressure means to act between said levers and trackways and cause the levers to raise the supporting means.

ROY D. SMITH.